United States Patent [19]
Hackel

[11] Patent Number: 5,157,545
[45] Date of Patent: Oct. 20, 1992

[54] LASER AMPLIFIER CHAIN

[75] Inventor: Richard P. Hackel, Livermore, Calif.

[73] Assignee: The United States of America as represented by the United States Department of Energy, Washington, D.C.

[21] Appl. No.: 707,540

[22] Filed: May 30, 1991

[51] Int. Cl.[5] .................. G02B 6/26; H01S 3/091
[52] U.S. Cl. .................... 359/345; 359/333; 372/70
[58] Field of Search ............ 359/176, 345, 333; 372/70

[56] References Cited

U.S. PATENT DOCUMENTS

| | | | |
|---|---|---|---|
| 4,039,962 | 8/1977 | Hughes | 359/345 |
| 4,132,955 | 1/1979 | Hughes | 359/345 |
| 4,513,402 | 5/1970 | Marrison | 372/70 |
| 4,947,134 | 8/1990 | Olsson | 359/345 |
| 5,039,199 | 8/1991 | Mallenauer et al. | 354/334 |

OTHER PUBLICATIONS

Masuda et al; Electronics Letters, May 10, 1990, vol. 26, #10, pp. 661-662.
Yamamoto et al., Opt. Quantum Electron., 1989, vol. 21, Spec. issue, pp. 75-88; abst. only supplied.
Olsson et al., Jour. of Lightwave Tech.; vol. 7, #5, May 1989, pp. 791-793.

*Primary Examiner*—Nelson Moskowitz
*Attorney, Agent, or Firm*—Miguel A. Valdes; Roger S. Gaither; William R. Moser

[57] ABSTRACT

A laser amplifier chain has a plurality of laser amplifiers arranged in a chain to sequentially amplify a low-power signal beam to produce a significantly higher-power output beam. Overall efficiency of such a chain is improved if high-gain, low efficiency amplifiers are placed on the upstream side of the chain where only a very small fraction of the total pumped power is received by the chain and low-gain, high-efficiency amplifiers are placed on the downstream side where a majority of pumping energy is received by the chain.

8 Claims, 1 Drawing Sheet

LASER AMPLIFIER CHAIN

The United States Government has rights in this invention pursuant to Contract No. W-7405-ENG-48 between the United States Department of Energy and the University of California for operation under Lawrence Livermore National Laboratory.

BACKGROUND OF THE INVENTION

This invention relates to a laser amplifier chain and more particularly to a manner in which laser amplifiers are arranged in a chain for efficiently amplifying a beam from a relatively low-power laser to obtain a high-power output beam.

In a situation, for example, where a high-power tunable laser is desired while only a relatively low-power tunable dye master oscillator is available, it has been known to make use of a pump laser such as a copper vapor laser to drive an amplifier. It has also been known for such a situation to make use of not only one amplifier but also a series of amplifiers forming a chain. No systematic studies have been made, however, regarding how to improve the efficiency of such a laser amplifier chain.

SUMMARY OF THE INVENTION

It is therefore a general object of the present invention to provide a laser amplifier chain by which a high-power tunable laser can be obtained from a relatively low-power oscillator such as a dye master oscillator.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the laser amplifier chain of this invention may comprise a plurality of laser amplifiers arranged serially from an upstream position to a downstream position such that an initial laser beam such as a pulse signal beam of average power about 10 mW from a dye master operator is received by the first-stage amplifier in the chain, and is amplified step-wise by pump power beams as it passes sequentially through the chain of these amplifiers. To improve the efficiency of operation of such a chain, lower-gain, higher-efficiency amplifiers are placed on the downstream side and higher-gain, lower-efficiency amplifiers are placed on the upstream side of the chain.

BRIEF DESCRIPTION OF THE DRAWINGS

The accompanying drawings, which are incorporated in and form a part of the specification, illustrate an embodiment of the present invention and serve to explain the principles of the invention. In the drawings.

DETAILED DESCRIPTION OF THE INVENTION

Figure 1:
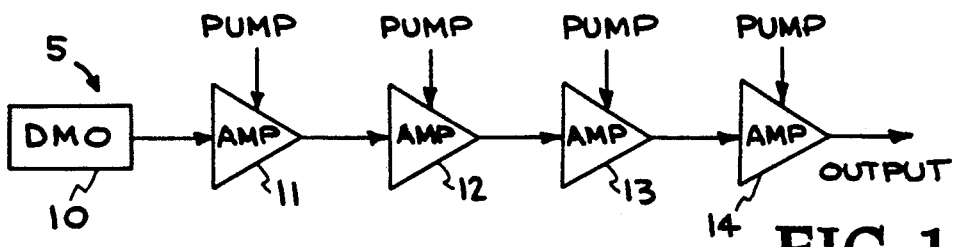
FIG. 1 is a schematic block diagram of a laser amplifier chain embodying the present invention, FIG. 2. is a schematic showing the transverse pumping of an amplifier in such a chain.

FIG. 1 shows schematically a laser amplifier chain 5 embodying the present invention with a master oscillator 10 such as a dye master oscillator (DMO) emitting a relatively low-power (say, 10 mW) laser beam, and a series of four amplifiers (AMP) 11, 12, 13 and 14 such as dye amplifiers forming an amplifier chain, each amplifier being pumped by a pump laser (not shown) such as a copper vapor laser. The particular number of stages (four amplifiers in the illustrated example) forming the chain is not intended to limit the scope of the invention but it is preferred to minimize this number in view of inter-stage losses which affects the overall efficiency of the system. Six, seven or more stages are conceivable but may be cumbersome to operate. A chain with only two stages will not be sufficiently efficient. To achieve a net gain on the order of 100,000 (such as from 10 mW to 1 kW), for example, three or four stages will be preferred.

Figure 2:
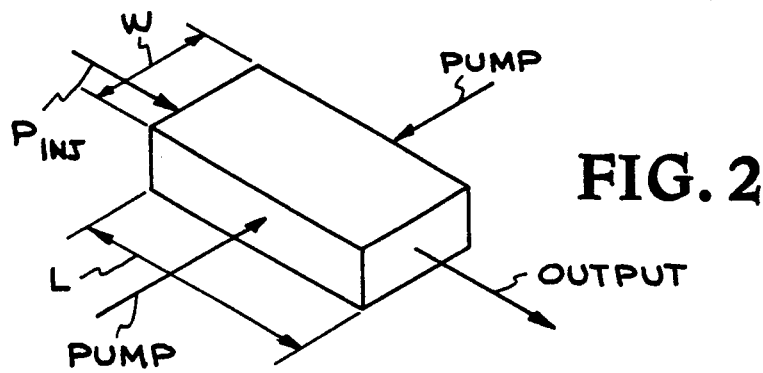

According to the present invention, these amplifiers 11, 12, 13 and 14 are all pumped transversely as illustrated schematically in FIG. 2. This is because the damage limit is reached more quickly with longitudinal pumping whereby both the signal beam to be amplified and the pump beams for amplifying the signal beam impinge upon the same optical surfaces.

Now, we are faced with the problem of how to construct a laser amplifier chain of the type shown in FIG. 1 that will achieve the task of amplification with improved overall efficiency, that is, the ratio of the difference between the final output power and the initial input power to the total pump power. In other words, there are high-gain amplifiers and low-gain amplifiers with different performance characteristics, and the question is how these different types of amplifiers should be connected to form an efficient chain.

Figure 3:
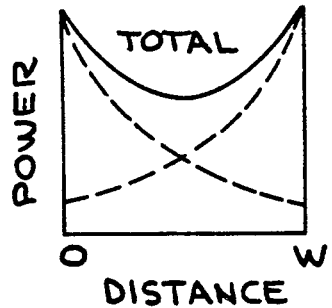
FIG. 3 is a graph schematically showing the spatial variation in the rate at which pump power is absorbed inside a transversely pumped laser amplifier with a relatively high absorption rate.
Figure 4:
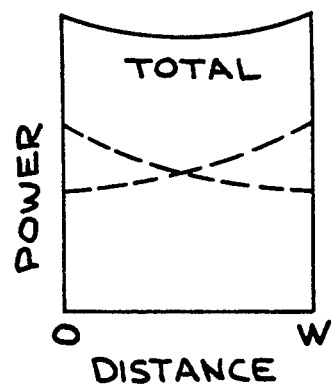
FIG. 4 is a graph schematically showing the spatial variation in the rate at which pump power is absorbed inside a transversely pumped laser amplifier with a relatively low absorption rate.

For the purpose of explaining one of the basic principles of the present invention, let us now consider any one of the transversely pumped amplifiers (11, 12, 13 and 14) as having length L and width W as shown in FIG. 2. Power $P_{pump}$ pumped into this amplifier enters it from mutually opposite sides as shown in FIG. 2. The rate at which pump power entering from one side is absorbed after traveling a distance x inside the amplifiers is given approximately by $P_{pump}\exp(-N\sigma_a x)$ where N is the number density of dye molecules in the amplifier and $\sigma_a$ is the absorption cross section. The transmitted power $P_{trans}$ is given by $P_{pump}\exp(-N\sigma_a W)$. Pump power entering from the opposite side is absorbed similarly by the amplifier. Since the width of the amplifier is denoted by W, the rate of total absorption of power (coming in from both directions) inside the amplifier at a position which is at distance x from one of the side surfaces may be written approximately as $P_{pump}(\exp(-$ $N\sigma_a x) + \exp[-N\sigma_a(W-x)]$), that is, the rate of pump power absorption inside each amplifier varies along the transverse direction substantially as a sum of two exponential functions, one increasing and the other decreasing in a mutually symmetrical manner. This is schematically illustrated in FIG. 3 for a case where $N\sigma_a W$ is relatively large and in FIG. 4 for a situation where $N\sigma_a W$ is relatively small. In both FIGS. 3 and 4, the curve indicated as "TOTAL" represents the spatial variation of the total rate of absorption.

Since it is important that the beam quality not be adversely affected, it is desirable that the rate of pump power absorption be spatially as uniform as possible. A qualitative comparison between FIGS. 3 and 4 immediately makes it clear that this is accomplished by decreasing $N\sigma_a W$ but this means $P_{trans}$ as defined above becomes large, that is, the amplifier does not absorb too much pump power and hence is not being run efficiently. According to the present invention, since high efficiency and spatial uniformity in power absorption are incompatible, $\exp(-N\sigma_a W)$ is set equal to about 10%, that is, $N\sigma_a W$ for each of the amplifiers 11, 12, 13 and 14 is about equal to 2.3.

Of the plurality of amplifiers in the chain 5, the last-stage amplifier 14 clearly must carry the burden of transmitting most power. This means, since the power density that can be transmitted through any amplifier is limited, that the width W of the last-stage amplifier 14 should generally be the largest, and a large value for W means that N should accordingly be small.

Now, small signal gain $G_{SS}$ of an amplifier as shown in FIG. 2 is defined by $N\sigma_e L$ where N and L are as defined above and $\sigma_e$ indicates the stimulated emission cross section of the amplifier. Since L cannot be made unreasonably large, an amplifier with a small N-value means an amplifier with a low small signal gain. In other words, low-gain amplifiers should be used generally on the downstream side of the chain 5 and hence high-gain amplifiers should be placed on the upstream side of the chain 5.

Figure 5:
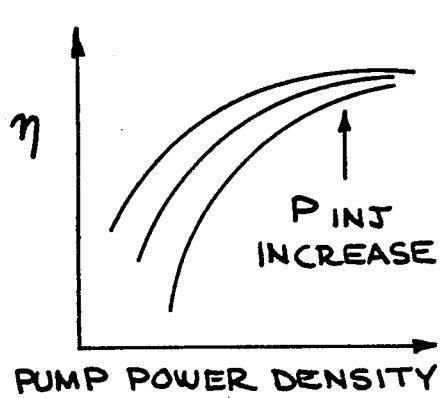
FIG. 5 is a graph showing schematically the relationship between pump power density and efficiency of a high-gain amplifier.
Figure 6:
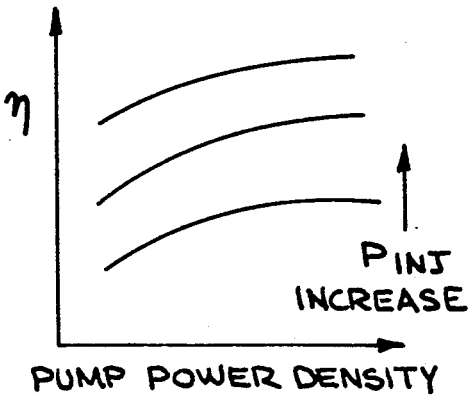
FIG. 6 is a graph showing schematically the relationship between pump power density and efficiency of a low-gain amplifier.

FIGS. 5 and 6 show schematically how efficiency $\eta$ varies as a function of injected power density ($P_{inj}$) and pump power density ($P_{pump}$) in the case respectively of a high-gain (of over 30) amplifier and a low-gain (of between 10 and 20) amplifier. It is to be noted that efficiency of a high-gain amplifier can be improved significantly by operating it with high pump power density but not so much by increasing $P_{inj}$. On the other hand, efficiency of low-gain amplifiers increases significantly with $P_{inj}$.

According to the present invention, the last-stage amplifier 14 in the chain 5 is a low-gain amplifier operated at high $P_{inj}$ so as to function as a high-efficiency amplifier. This is important from the point of view of the overall efficiency because this is where a majority of pump energy is dumped. For this reason, the last-stage amplifier 14 is sometimes referred to as a power amplifier. The first-stage amplifier (preamplifier) 11, by contrast, is a high-gain amplifier. As shown in FIG. 5, such an amplifier must be operated with high $P_{pump}$ in order to be efficient. Since the first-stage amplifier 11 requires only a very small portion (say, on the order of 1%) of the total pump power, its efficiency is less important from the overall point of view.

For the reasons discussed above, the second-stage amplifier 12 has a lower gain than the first-stage amplifier 11 and the third-stage amplifier 13 has a still lower gain than the second-stage amplifier 12 but its gain is larger than that of the last-stage power amplifier 14. Efficiency generally increases from the first-stage amplifier 11 to the last-stage amplifier 14.

As a specific example, a laser amplifier chain embodying the present invention for amplifying an input laser beam of average power on the order of 10 mW to obtain an output beam of average power on the order of 1 kW includes four amplifiers arranged as shown in FIG. 1, the first-stage amplifier 11 operating at efficiency of 20-30% with gain of about 100 (to output an average power of about 1 W) or generally in the range of 50-200, the second-stage amplifier 12 receiving the output from the first-stage amplifier 11 and operating at efficiency of 20-30% with gain of about 30 (to output an average power of about 30 W) or generally in the range of 10-100, the third-stage amplifier 13 receiving the output from the second-stage amplifier 12 and operating at efficiency of 35-45% with gain of about 8 (to output an average power of about 240 W) or generally in the range of 4-20, and the last-stage power amplifier 14 receiving the output from the third-stage amplifier 13 and operating at efficiency of 45-55% with gain of about 4 (to output an average power of about 1 kW) or generally in the range of 2-8.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the number of amplifiers in the chain is not limited to 4 as mentioned above. The efficiencies and gains at which the individual amplifiers in the chain are to be operated should be adjusted, depending on the purposes for which power is being amplified by the chain. The embodiment was chosen and described in order to best explain the principles of the invention and its practical application to thereby enable others skilled in the art to best utilize the invention in various embodiments and with various modifications as are suited to the particular use contemplated.

WHAT IS CLAIMED IS:

1. A laser amplifier chain in combination with a master oscillator and pumping means for providing pump power to said chain, said chain having an upstream end proxymal to said master oscillator and a downstream end distal from said master oscillator and comprising a plural number of serially arranged amplifiers including
   a first-stage amplifier at said upstream end and arranged to receive a signal beam emitted from said master oscillator and power from said pumping means to thereby amplify said signal beam, and
   a last-stage amplifier at said downstream end arranged to receive said signal beam from said first-stage amplifier and power from said pumping means to thereby further amplify said signal beam,
   said amplifiers being transversely pumped and operated at gains such that the gain of said first-stage amplifier being the highest and the gain of said last-stage amplifier being the lowest.

2. The laser amplifier chain of claim 1 wherein said amplifiers are operated at efficiencies which increase from said first-stage amplifier sequentially to said last-stage amplifier.

3. The laser amplifier chain of claim 1 wherein said plural number is greater than 2 and smaller than 5.

4. The laser amplifier chain of claim 3 wherein said plural number of amplifiers further include a second-stage amplifier between said first-stage amplifier and said last-stage amplifier, and a third-stage amplifier between said second-stage amplifier and said last-stage amplifier.

5. The laser amplifier chain of claim 4 wherein said first-stage, second-stage, third-stage and last-stage amplifiers are operated at gains respectively of 50–200, 10–100, 4–20 and 2–8.

6. The laser amplifier chain of claim 4 wherein said first-stage, second-stage, third-stage and last-stage amplifiers are operated at efficiencies respectively of 20–30%, 20–30%, 35–45% and 45–55%.

7. The laser amplifier chain of claim 5 wherein said first-stage, second-stage, third-stage and last-stage amplifiers are operated at efficiencies respectively of 20–30%, 20–30%, 35–45% and 45–55%.

8. The laser amplifier chain of claim 1 wherein said master oscillator is a dye laser and said pumping means include copper vapor lasers.

* * * * *